United States Patent [19]

Gomez

[11] Patent Number: 4,514,464
[45] Date of Patent: Apr. 30, 1985

[54] LAMINATES OF POLYCARBONATE OR ACRYLATE AND PLASTICIZED POLYVINYL BUTYRAL

[75] Inventor: I. Luis Gomez, Longmeadow, Mass.

[73] Assignee: Monsanto Company, St. Louis, Mich.

[21] Appl. No.: 559,069

[22] Filed: Dec. 7, 1983

[51] Int. Cl.³ .................. B32B 27/08; B32B 27/30; B32B 27/36
[52] U.S. Cl. .................................. 428/332; 156/106; 156/327; 156/331.4; 156/333; 428/412; 428/423.1; 428/425.6; 428/437; 428/522
[58] Field of Search .............. 428/437, 412, 424.6, 428/425.6, 423.1, 522; 156/106, 327, 331.4, 333

[56] References Cited

U.S. PATENT DOCUMENTS

| | | | |
|---|---|---|---|
| 3,458,388 | 7/1969 | Moynihan | 156/106 X |
| 3,520,768 | 7/1970 | Peilstocker et al. | 428/412 X |
| 3,916,074 | 10/1975 | Knackstedt et al. | 428/437 X |
| 4,121,014 | 10/1978 | Shaffer | 428/412 |
| 4,128,694 | 12/1978 | Fabel et al. | 428/437 X |
| 4,243,719 | 1/1981 | Holmes | 156/106 X |
| 4,312,903 | 1/1982 | Molari, Jr. | 428/437 X |

*Primary Examiner*—Thomas J. Herbert
*Attorney, Agent, or Firm*—Michael J. Murphy; William J. Farrington; Paul D. Matukaitis

[57] ABSTRACT

Low temperature impact delamination of laminates containing adjacent layers of polycarbonate or polyacrylate and polyvinyl butyral is overcome by a flexible, hydrophobic, adhesive coating of poly-vinylidene chloride or urethane acrylate resin at the interface between the polycarbonate or polyacrylate and the polyvinyl butyral.

7 Claims, No Drawings

LAMINATES OF POLYCARBONATE OR ACRYLATE AND PLASTICIZED POLYVINYL BUTYRAL

CROSS REFERENCE TO RELATED APPLICATIONS

1. "Plasticized Polyvinyl Butyral Interlayers And Process For Forming Same", I. Luis Gomez, U.S. Ser. No. 523,305, Filed: Aug. 15, 1983.
2. "Laminates Comprising Plasticized Polyvinyl Butyral Interlayers", I. Luis Gomez, U.S. Ser. No. 522,929, Filed: Aug. 12, 1983.
3. "Plasticizer Blend For Polyvinyl Butyral", I. Luis Gomez, U.S. Ser. No. 522,932, Filed: Aug. 12, 1983.

BACKGROUND OF THE INVENTION

This invention relates to laminated safety glass assemblies and more particularly to such assemblies which contain polycarbonate or polyacrylate and polyvinyl butyral (PVB) sheets and which exhibit decreased delamination of the PVB on impact at very low temperatures.

In recent years sociologists and psychologists have started a movement toward prisons without bars. Thick layers of impact resistant polycarbonate initially used in such applications were determined to be inadequate since the polycarbonate could be burned or scratched or dissolved or fractured when heated or abused. Moreover, when exposed to the elements the polycarbonate turned yellow, lost its strength and was susceptable to crazing. Based on this early work a need was defined for a material for security applications which was strong, chemically impervious, and scratch and fracture resistant over a wide range of ambient conditions.

Thereafter laminates of one or more layers of glass with one or more layers of polycarbonate were proposed which in use were mounted with the glass on the outside exposed to the elements and the polycarbonate either forming the innermost surface or positioned inboard of a glass layer forming such innermost surface. However, with these laminates an interlayer between the glass and polycarbonate is necessary since polycarbonate will not adequately adhere to glass.

Thermoplastic polyurethane has been used to laminate polycarbonate to glass but the polyurethanes which have been used are costly. Commercially available grades of PVB sheet are not acceptable as an interlayer to adhere polycarbonate to glass because the plasticizer in the PVB crazes the polycarbonate. To solve this a special barrier coating, as disclosed in U.S. Pat. No. 4,243,719, was proposed between the polycarbonate and PVB to keep the plasticizer in the PVB away from the polycarbonate. The PVB is still necessary since the coating will not adhere to the glass and the PVB assists in absorbing energy on impact.

In the above-referenced commonly owned copending applications, PVB sheets are disclosed which are plasticized with an improved blend which does not craze polycarbonate or polyacrylate and wherein the sheets exhibit improved low temperature performance properties when present as a functional interlayer in a security glass laminate. However, when such laminates are exposed to very low temperatures on the order of minus 10° C. the interface between the PVB and polycarbonate or polyacrylate is sufficiently weakened that on impact some delamination of the PVB from the polycarbonate or polyacrylate can be detected. Low temperature delamination is preferably avoided since it adversely affects panel integrity and consequently the degree of safety provided when used in a multilayered security panel.

A need, therefore, exists in the art for a precursor laminate containing plasticized PVB sheet and polycarbonate or polyacrylate which is usable with glass in laminated security glass applications which exhibits little or no delamination during impact at very low temperatures on the order of minus 10° C.

SUMMARY OF THE INVENTION

Now improvements have been developed which overcome the aforementioned deficiencies and satisfy the needs of the prior art.

Accordingly, it is a principal object of this invention to provide a laminate of plasticized PVB secured to polycarbonate (PC) or polyacrylate (PA) which exhibits significantly increased delamination resistance on impact at very low temperatures on the order of minus 10° C.

Another object is to provide improvements in such a laminate via a special flexible coating which improves the bond between PVB and PC or PA at such low temperatures.

Other objects will in part be obvious and will in part appear from the following description and claims.

These and other objects are accomplished in a laminate comprising a sheet of polycarbonate or polyacrylate, a sheet of polyvinyl butyral plasticized with a plasticizer which does not significantly craze polycarbonate or polyacrylate when in contact therewith and a layer of polyvinylidene chloride or cured urethane acrylate resin interposed between the interfacial surfaces of the polycarbonate or polycacrylate and the PVB sheets for bonding the sheets together and resisting delamination on impact at temperatures at least as low as minus 10° C.

The polyvinylidene chloride or urethane acrylate flexible coatings of the present invention are hydrophobic and adhere well to PC or PA as well as plasticized PVB at very low temperatures and are capable of surviving the pressure and temperature conditions without melting or softening to which the laminate is subsequently exposed in preparing the final multi-ply assembly with glass.

The urethane acrylate composition for coating polycarbonate or polyacrylate is a reactive, viscous liquid mixture of (a) general purpose, nonyellowing, urethane-based oligomers as the major component and (b) one or more reactive monomers which serve as crosslinking agent(s) and to introduce acrylate functionality into the coating composition. The liquid coating mixture polymerizes and cures under the influence of high intensity radiation from electron beam and/or ultra-violet (UV) sources to a flexible, crosslinked, thermoset coating structure. Optionally usable in the liquid mixture which will form the cured coating are flow control additives and, especially when curing by UV radiation, a photoinitiator is included. The preferred curing is by electron beam since a photoinitiator is then not required and consequently photoinitiator residues in the cured coating are avoided. The resistance to outdoor UV exposure of the multi-layered panel is impaired by the presence of such photoinitiator residues.

In general the urethane oligomers component (a) of the coating composition can broadly be described as the reaction product of a difunctional polyol and an aromatic or aliphatic diisocyanate. Aliphatic diisocyanate is preferred to give optimum stability of the cured coating against degradation from utra-violet exposure. Instead of providing acrylate functionality in the system via the reactive monomers of component (b) this can be alternately achieved during synthesis of the urethane oligomer, for example by using a diisocyanate tipped with vinyl acrylate.

Usable reactive monomers as component (b) in the urethane acrylate coating composition comprise vinyl pyrrolidone and acrylic monomers. The vinyl pyrrolidone can also function to increase the hardness of the cured coating and/or reduce the viscosity of the precursor liquid mixture for better processability. The presence of the acrylate radical in the cured coating imparts abrasion resistance which is desirable since lamination of the coated polycarbonate or polyacrylate to other components of the multi-layered assembly frequently occurs in a different location from where the coating is applied and it is important that the coating resist scratching during handling between assembly stations. Acrylate also promotes clarity and may improve weatherability of the cured coating in terms of resistance to UV degradation. Usable acrylic monomers comprise tetraethylene glycol diacrylate, ethoxyethoxy-ethyl acrylate, 2-ethylhexyl acrylate, 2-hydroxyethyl acrylate, 2-phenoxyethyl acrylate and mixtures thereof. A suitable photoinitiator is 2,2'-diethoxyacetophenone. DC-193, a silicone surfactant from Dow Corning, represents a usable flow control additive.

The urethane acrylate coating composition should comprise from about 70 to 90 parts by weight of (a) and about 10 to 30 parts of (b). When photoinitiator and flow control additives are used, they should be present at 1 to 2 and about 0.3 parts respectively per 100 parts of (a) and (b).

Commercially available urethane based oligomers operable in formulations usable in the invention can be obtained from GAF Corp., New York, N.Y. as Gafgard TM 238 or 233 and from Thiokol Specialty Chemicals Division, Trenton, N.J. as Uvithane ®783 or 893. A particularly suitable formulation is a blend of (a) 70 wt. % Uvithane 783 urethane-based oligomer, (b) 15 wt. % RC-20, a registered trademark of Thiokol Corp. denoting ethoxyethoxyethyl acrylate, (c) 15 wt. % V-Pyrol from GAF Corp. which is vinylpyrrolidone, and two parts per 100 parts of (a), (b) and (c) of diethoxyacetophenone photoinitiator, available from Upjohn Co.

The urethne acrylate liquid coating composition should be applied to the interfacial surface of the PVB and PC or PA by brushing, spraying or roll coating onto the surface of washed PC or PA prior to lamination. The liquid mixture is then cured by exposure, preferably in a nitrogen atmosphere, to a conventional source of high energy ionizing radiation generated by an electron beam generator machine, such as a Dynamatron made by Radiation Dynamics, Inc. Dosage should be on the order of about 3 megarads. Alternatively, curing can be by exposure to ultraviolet radiation such as by passage through a housing having plural banks of ultraviolet light emitting lamps.

The polyvinylidene chloride (PVDC) coating embodiment of the invention should be applied as an emulsion of PVDC in water by the same application techniques described above for the urethane acrylate coating. Curing is in ambient air or at elevated temperatures (e.g. 38°–66° C.). A usable PVDC emulsion coating is available as Daran 820 from W. R. Grace and Co., Organic Chemicals Division. This is a 50% emulsion of PVDC having a pH of about 1.5 to 2.5 and a particle size of 0.08 to 0.12 microns.

The thickness of the urethane acrylate or PVDC coating after curing will vary between about 0.013 to 0.13 mm and will depend on the method of application. Spraying produces the preferred thickness of between 0.025 to 0.075 mm. The cured film coating which must be transparent should have the following desirable properties: (1) a glass transition temperature (Tg) of 15° C. or less and (2) at least 30% elongation at fail. Tg of the cured coating film can be obtained by applying a coating of the material on wax paper and then removing the latter and measuring Tg using a Rheometric Mechanical Spectrometer which is a rectangular torsion test conducted in a nitrogen atmosphere at a constant frequency (1 hertz) and temperature. Alternatively, and especially useful for measuring Tg of thin films, a Rheovibron manufactured by Tayo Instrument of Japan can be used. Percent elongation at fail is measured according to D882-80.

After the cured urethane acrylate or PVDC film coating has been applied to the interfacial surface of the PC or PA and the PVB sheeting, the sheets are assembled for lamination. In the lamination process, the sheets are initially sandwiched between two rigid pressing plies such as glass sheets and the pre-assembled laminate is then sucessively subjected to heat and pressure sufficient to facilitate air removal and hold the plies of the laminate together. Alternatively, vacuum bagging for about twenty hours can be used to achieve equivalent results. With this approach the pre-assembled laminate is bagged in a plastic film, such as of polyethylene terephthalate, the bag sealed with tape through which extends a hollow access tube by means of which negative pressure is imposed on the interior of the bag containing the assembly.

Final lamination is usually conducted in an oil or, preferably, an air autoclave or other suitable high pressure equipment where care must be taken to protect the cured coating. Generally speaking, the laminate is heated to a temperature of about 93° to 116° C. at a pressure of not more than about 1000 KPa for about 60 to 90 minutes to laminate the sandwich. The temperature of the air is then reduced, the pressure is released and the sandwich removed from the autoclave, cleaned and made ready for use or shipment.

With respect to the PVB layer of the laminates according to the present invention, any plasticizer or blend of plasticizers may be used which does not significantly craze PC or PA when PVB plasticized therewith contacts PC or PA. More conventional plasticizers for PVB which attack PC or PA are not used since if a crack is present in the coating of the present invention and/or if air is trapped in a bubble between the PC or PA and the coating during application, the plasticizer can leak through the coating and contact and eventually attack the PC or PA substrate. Typically usable plasticizers are the sulfonamide and phosphate plasticizers disclosed respectively in U.S. Pat. Nos. 3,539,442 and 3,406,086 and the castor oil based plasticizers disclosed in U.S. Pat. No. 4,128,694. With respect to such '964 patent the plasticizer disclosed is a specific fatty acid multiester of an alcohol having 2 to 4 hydroxyl groups and a $C_{16}$ to $C_{20}$ unsaturated fatty acid having a hydroxyl group attached to the acid molecule. The term "multiester" as used herein means an ester formed by esterifying more than one hydryoxyl group of such an alcohol with such an acid.

In the above-referenced copending applications, a monoester species of such specific fatty acid multiester is combined with the latter to form a plasticizer blend for PVB which unexpectedly lowers the Tg of PVB plasticized therewith and incrementally improves the PBV interlayer penetration resistance and peel adhesion to polycarbonate. Performance with polyacrylate is predicted to be similar. The plasticizer blend of such copending applications, which is the preferred PVB plasticizer in the present invention, therefore comprises a multiester component (e.g. a triester) combined with a monoester glycol component, each component being derivable from the same class of unsaturated fatty acids.

The preferred multiester component of the preferred plasticizer blend is contained in castor oil which is a triglyceride ester of fatty acids. It comprises a mixture of esters of glycerol with the following acids, (the figure in parentheses being the approximate weight percent of esters formed from that acid): ricinoleic acid (89.5%), oleic acid (3.0%), linoleic acid (4.2%), stearic acid 1% and dihydroxystearic acid. Approximately 63.6% of the ricinoleate is triester, (glycerol triricinoleate) 31.1% diester and 5.1% the monoester. The latter level of monoester is insufficient in itself to provide the improvement. Other multiesters found useful wherein one molecule of the esterifying acid has reacted with each available hydroxyl of the alcohol are those based on triethylene glycol, trimethylol propane and pentaerythritol.

The unsaturated fatty acid monoester found synergistically effective as an additional plasticizer in combination with the preferred castor oil in PVB sheet in combination in a blend with the multiester referred to above is a monoester of a glycol and a $C_{16}$ to $C_{20}$ unsaturated fatty acid having a hydroxyl group attached to the acid molecule. The preferred monoester is propylene glycol 1,2 monoricinoleate.

The acids that may be used to form the multiester and monoester plasticizer components of the blend have from 16 to 20 carbon atoms and include in addition to ricinoleic acid, (12-hydroxyoleic acid) other hydroxyoleic acids with the hydroxyl group located other than on the "12" carbon atom such as 6-, 8-, 14-, or 16-hydroxy-oleic acid, 12-hydroxyelaidic acid and acids with the same empirical formula with the hydroxyl located on other than the "12" atom. Also included are the corresponding variations of 12-hydroxy-hexodec-9-enoic acid and 12-hydroxy-eicos-9-enoic acid.

A single acid may provide all the esterifying acid groups but usually a mixture of unsaturated esterifying acids, are used, provided that the esterifying acids together provide at least one unsaturation and one hydroxyl group per molecule of plasticizer.

The amount of plasticizer in the PVB interlayer should be from 10 to 55 parts per hundred parts of PBV resin (phr). The preferred amount is 20 to 50 phr and particularly preferred is 30 to 40 phr.

The weight proportion of monoester to multiester in the preferred plasticizer blend should be between about 1:1 to about 5:1. When castor oil is used as the multiester, allowance may optionally be made for the minor level of monoester therein in determining the total amount of monoester to be used in the blend. It is preferred that the monoester be present as the major constituent of the plasticizer blend, i.e. present in amount greater than the multiester. The most preferred proportion of monoester to multiester is 2:1.

The monoesters of the preferred plasticizer blend are commercially available from CasChem Inc., Bayonne, N.J., 07002 under the registered trademark Flexricin.

In general, the polyvinyl butyral resin employed may be considered to be made up, on a weight basis, of from 5 to 25 percent hydroxyl groups, calculated as polyvinyl alcohol, 0 to 4 percent acetate groups, calculated as polyvinyl acetate, and the balance substantially butyral. The polyvinyl butyral resin preferably contains, on a weight basis, from 10 to 25 percent hydroxyl groups, calculated as polyvinyl alcohol and from 0 to 10 percent acetate groups, calculated as polyvinyl acetate, the balance being substantially butyraldehyde acetal.

The polycarbonate component may be any suitable sheet of polycarbonate such as disclosed in U.S. Pat. Nos. 3,028,365 and 3,117,019 and is preferably prepared by reacting di(monohydroxyaryl)-alkanes with derivatives of carbonic acid such as phosgene and bischlorocarbonic acid esters of di(monohydroxy-aryl)-alkanes. Commercial polycarbonate sheeting is available from General Electric Company under the trademark Lexan.

Where the resin sheet is a polyacrylate this may be as an ester of a lower aliphatic alcohol, such as butyl-, propyl-, ethyl-, or methyl alcohol and acrylic-, methacrylic-, ethacrylic, propacrylic- or butacrylic-acid. By far the most convenient is polymethyl methacrylate.

The plasticized PVB interlayer can be used to make a simple laminate with the interlayer in contact on at least one surface with a polycarbonate or a polyacrylate sheet which has been coated according to the present invention. Usually one of the surfaces of the PVB interlayer will be in contact with a different material such as glass.

For security glass it is usual to provide multiple layers, such as four or more, comprising plasticized interlayers and polycarbonate or polyacrylate layers and glass layers laminated together to form laminates of from ½ inch up to several inches in thickness. For such purposes the construction usually comprises glass/interlayer/coated polycarbonate or polyacrylate (both sides)/interlayer/glass units multiplied as appropriate.

The laminates produced may be treated to reduce light transmission by tinting one or more of the component layers or by supplying a metallized surface to one or more of the layers. The treatment can be such as to produce a uniform reduction in light transmission over the whole sheet or perhaps in the form of a band or other form of localized effect.

Laminates according to the present invention with glass are broadly useful in any application requiring a safety glass assembly such as in vehicular windshields, but are especially useful in security applications such as prisons without bars and installations requiring a somewhat lesser degree of security such as bank windows, cashier booths, jewelry counters and the like. Applications in which such laminates can be used are disclosed in U.S. Pat. No. 4,243,719, col. 10, line 3 through col. 12, line 36, the content of which is incorporated herein by reference.

In addition to the plasticizers, the PVB interlayers may contain other additives such as dyes, ultraviolet light stabilizers, salts to control adhesion and antioxidants and may, if desired, be treated with additives to improve laminating efficiency.

EXAMPLES

The invention is further described with reference to the following examples which are for illustration only and are not intended to imply any limitation or restriction on the invention. Unless otherwise expressed, parts and percentages are given on a weight basis.

EXAMPLE 1

Six 30.5 cm by 30.5 cm by 3.1 cm polycarbonate sheets available under the trademark LEXAN were thoroughly washed and dried. The polycarbonate sheets were then rod-coated with a urethane acrylate liquid mixture of (a) 70 parts urethane oligomer available from Thiokol as Uvithane 893; (b) 10 parts tetraethylene glycol diacrylate; (c) 20 parts vinyl pyrrolidone and (d) 1 part per 100 parts of (a) plus (b) plus (c) of diethoxyacetophone as photoinitiator. Rod coating was achieved by placing an excess of the liquid mixture adjacent one edge of a sheet and then a number 9 grooved coating rod was passed through the mixture to evenly distribute it on the sheet surface at a thickness of about 0.025 mm in that the depth of the rod groove controlled the thickness of the liquid mixture on the sheet. The thus coated sheets were immediately placed on a conveyor support and passed at a line speed of about 6.4 m/min. through a Linde Photocure UV Oven containing 4 ultraviolet lamps mounted in tandem, each rated at 100 watts/in. On exiting the oven the mixture was found to be cured to a tough, flexible coating since the coating could be manually bent with the substrate without rupturing. This same procedure was then repeated for each sheet to provide a cured coating on the opposite side. Then 30.5 cm by 30.5 cm by 0.76 mm sheets of Saflex® polyvinyl butyral plasticized with 42.75 parts per 100 parts of PVB of a blend containing 30 parts of Flexricin 9 propylene glycol monoricinoleate and 12.75 parts of cosmetic grade castor oil was placed against the cured urethane acrylate film coating and squared on four sides with the underlying substrate.

The coated polycarbonate configuration was then sandwiched between two 30.5 cm by 30.5 cm by 0.63 cm glass sheets and was then prepressed at 551 kPa by passing through the nip of a pair of rotating rubber covered rolls. The thus prepared laminates were then placed in an air autoclave for 2 to 3 hours at pressures incrementally increased as follows: temperature and pressure were raised to 116° C., 1000 KPa and these conditions held for one hour, then dropped to about 40° C. and held for 20 min. and then the pressure was releated.

After lamination, each entire sample was tested for low temperature impact resistance using a modified version of UL 972. The samples were conditioned at minus 10° C. for about 1.5–2 hrs. and then the preconditioned samples were placed in a frame where a 2.3 Kg steel ball was dropped from 3.05 m five times on each sample. The samples were then visually examined and no delamination of the PVB from either the glass or the coated polycarbonate was observed indicating excellent panel integrity.

EXAMPLE 2

The foregoing procedure of Example 1 was repeated except that the sample size was reduced to 10.1 cm by 15.2 cm., the urethane acrylate liquid mixture for the coating was Gafgard®233, commercially available from GAF Corp., no photoinitiator was used since curing was by electron beam radiation and testing was done by manually striking each sample five times with a hammer. Curing was under nitrogen via a single pass per side through an electron beam apparatus to give a dosage of 3 megarads per side (beam current of 3 m A, terminal voltage of 150 kV). On checking the samples after low temperature impact no delamination was detected indicating excellent panel integrity.

EXAMPLE 3

The foregoing procedure of Example 1 was repeated except that the samples were the same size as in Example 2 and instead of the urethane acrylate liquid mixture, the polycarbonate surfaces were rod coated with a 50% solids emulsion of polyvinylidene chloride commercially available from W. R. Grace & Co., Organic Chemicals Division as Daran®820. The emulsion had a specific gravity of 1.252–1.265 and the solids had an average particle size of 0.10 to 0.14 microns. THe coated substrates were dried in ambient air. On checking the samples after low temperature impact no delamination was detected indicating excellent panel integrity.

EXAMPLE 4

This is a control example. The foregoing procedure of Example 1 was repeated except that the polycarbonate layer was uncoated, the samples were 0.6 m. by 0.6 m. and unmodified UL 972 procedure was followed in testing for low temperature delamination—i.e., a 2.3 Kg steel ball was dropped five times on each sample from a height of 2.4 m. Examination of the impacted samples revealed that some detectable delamination of the PVB from the glass and polycarbonate had occurred.

Coated polyacrylate according to the invention is predicted to be equivalent to polycarbonate in laminates with plasticized PVB sheet.

While certain specific embodiments of the invention have been described with particularity herein, it will be recognized that various modifications thereof will occur to those skilled in the art. The scope of the invention, therefore, is to be limited solely by the scope of the following claims.

I claim:
1. A laminate comprising a sheet of polycarbonate or polyacrylate, a sheet of polyvinyl butyral plasticized with a plasticizer which does not significantly craze said polycarbonate or polyacrylate when said plasticized polyvinyl butyral contacts said polycarbonate or polyacrylate and a layer of polyvinylidene chloride or cured urethane acrylate resin interposed between the interfacial surfaces of said sheet of polycarbonate or polyacrylate and said sheet of polyvinyl butyral for bonding said sheets together and resisting delamination on impact at temperatures at least as low as about minus 10° C.

2. The laminate of claim 1 wherein said interposed layer is polyvinylidene chloride.

3. The laminate of claim 1 wherein said interposed layer is urethane acrylate resin.

4. The laminate of claim 1, 2 or 3 wherein the thickness of said interposed layer is about 0.013 to 0.13 mm.

5. The laminate of claim 4 wherein the plasticizer in the polyvinyl butyral sheet comprises (a) a multiester of an alcohol having 2 to 4 hydroxyl groups and a $C_{10}$ to $C_{20}$ unsaturated fatty acid having a hydroxyl group attached to the acid molecule and (b) a monoester of a glycol and such $C_{16}$ to $C_{20}$ unsaturated fatty acid.

6. The laminate of claim 5 wherein the monoester is propylene glycol-1,2 monoricinoleate.

7. The laminate of claim 1 wherein said interposed layer is hydrophobic.

* * * * *